(12) United States Patent
Moriwaki

(10) Patent No.: US 11,645,970 B2
(45) Date of Patent: May 9, 2023

(54) DISPLAY DEVICE AND IMAGE DISPLAY METHOD OF MULTIMONITOR SYSTEM

(71) Applicant: Sharp NEC Display Solutions, Ltd., Tokyo (JP)

(72) Inventor: Daisuke Moriwaki, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 17/468,123

(22) Filed: Sep. 7, 2021

(65) Prior Publication Data
US 2021/0407374 A1    Dec. 30, 2021

Related U.S. Application Data

(63) Continuation of application No. PCT/JP2019/010824, filed on Mar. 15, 2019.

(51) Int. Cl.
*G09G 5/00* (2006.01)
*G09G 3/20* (2006.01)
*G06F 3/14* (2006.01)

(52) U.S. Cl.
CPC ......... *G09G 3/2096* (2013.01); *G06F 3/1446* (2013.01); *G09G 2300/026* (2013.01); *G09G 2370/04* (2013.01)

(58) Field of Classification Search
CPC ........... G09G 3/2096; G09G 2300/026; G09G 2370/04; G06F 3/1446
USPC ........................................................ 345/1.1
See application file for complete search history.

(56) References Cited

U.S. PATENT DOCUMENTS

| 2010/0328336 | A1* | 12/2010 | Si | G09G 3/3666 |
| | | | | 345/589 |
| 2011/0119592 | A1* | 5/2011 | Tada | H04N 21/25825 |
| | | | | 715/736 |
| 2012/0268350 | A1* | 10/2012 | Yoshimura | G09G 3/3426 |
| | | | | 345/1.3 |
| 2020/0004491 | A1* | 1/2020 | Seo | H04N 9/12 |

FOREIGN PATENT DOCUMENTS

| CN | 108134918 A | 6/2018 |
| JP | 2005-274937 A | 10/2005 |
| JP | 2011-109303 A | 6/2011 |
| JP | 2017-156414 A | 9/2017 |

OTHER PUBLICATIONS

International Search Report (ISR) (PCT Form PCT/ISA/210), in PCT/JP2019/010824, dated Jun. 11, 2019.

* cited by examiner

*Primary Examiner* — Jennifer T Nguyen
(74) *Attorney, Agent, or Firm* — McGinn I.P. Law Group, PLLC.

(57) ABSTRACT

A display device is in a multi-monitor system in which a plurality of display devices are connected using a daisy chain to display an image signal. The display device may include, but is not limited to, a reception unit configured to receive signal information that is information regarding a display of the image signal on a display device from the display device connected to an own display device; a comparison unit configured to compare the received signal information and signal information of the image signal in the own display device; and an output unit configured to output an instruction to perform a reset on at least one of the plurality of display devices when the two types of signal information are determined to be different as a result of the comparison.

16 Claims, 11 Drawing Sheets

| DISPLAY DEVICE 20-1 | 1920 × 1080 |
|---|---|
| DISPLAY DEVICE 20-2 | 1920 × 1080 |

| DISPLAY DEVICE 20-1 | 1920 × 1080 |
|---|---|
| DISPLAY DEVICE 20-2 | 800 × 600 |

DISPLAY DEVICE AND IMAGE DISPLAY METHOD OF MULTIMONITOR SYSTEM

TECHNICAL FIELD

The present invention relates to a display device and an image display method of multi-monitor system.

BACKGROUND ART

There are various types of resolutions of image signals such as (640×480), (800×600), and (1920×1080). If an image signal is input, a display device determines the resolution of the image signal, sets it to an appropriate resolution, and displays an image. However, some display devices that configure a multi-monitor system erroneously determine the resolution in rare cases. If there is a display device that has erroneously determined the resolution, when one large screen is configured in the multi-monitor system, there are problems that only the display device that has erroneously determined the resolution cannot display an area allocated to itself correctly, and it cannot be connected to an image of another normal display device.

A technology for preventing or restoring from an occurrence of a defect in a system in which a plurality of image display devices are connected using a daisy chain is disclosed in Patent Literature 1.

CITATION LIST

Patent Literature

[Patent Literature 1]
Japanese Unexamined Patent Application, First Publication No. 2017-156414

SUMMARY OF INVENTION

Technical Problem

As described above, in the multi-monitor system, an image may be erroneously determined in rare cases and an image may not be displayed correctly among the plurality of connected display devices. When an image is erroneously determined, the user usually performs reset processing on the display device that has erroneously determined the image by turning the power on again or plugging and unplugging a cable to restore it. However, such reset processing requires a great deal of effort from the user.

In view of the problems described above, an object of the present invention is to provide a display device and a display method of a multi-monitor system that can be automatically restored even if an image is erroneously determined among a plurality of connected display devices.

Solution to Problem

To solve the problems described above, a display device according to one aspect of the present invention is a display device in a multi-monitor system in which a plurality of display devices are connected using a daisy chain to display an image signal, and includes a reception unit configured to receive signal information that is information regarding a display of the image signal on a display device from the display device connected to an own display device, a comparison unit configured to compare the received signal information and signal information of the image signal in the own display device, and an output unit configured to output an instruction to perform a reset on at least one of the plurality of display devices when the two types of signal information are determined to be different as a result of the comparison.

A display device according to another aspect of the present invention is a display device in a multi-monitor system in which a plurality of display devices are connected using a daisy chain to display an image signal, and includes a first reception unit configured to receive a command to transmit signal information that is information regarding a display of the image signal on a display device from the display device connected to an own display device, a transmission unit configured to transmit the signal information to a display device that is a transmission source of the command if the command is received, a second reception unit configured to receive an instruction to perform a reset, which is transmitted when two types of signal information are determined to be different as a comparison result of comparing signal information transmitted from a display device that is a transmission source of the command with signal information of the image signal in the display device that is a transmission source of the command in the display device that is a transmission source of the command, and a reset execution unit configured to perform a reset of the own display device if the instruction to perform a reset is received.

An image display method of a multi-monitor system according to still another aspect of the present invention is an image display method of a multi-monitor system in which a plurality of display devices are connected using a daisy chain to display an image signal, and includes a process of receiving, by a second display device, a command to transmit signal information that is information regarding a display of the image signal in a first display device from the first display device and of transmitting the signal information to the first display device, a process of receiving, by the first display device, signal information of the image signal in the second display device from the second display device, of comparing the received signal information with signal information of the image signal in an own display device, and of outputting an instruction to perform a reset on at least one of the plurality of display devices when the two types of signal information are determined to be different a result of the comparison, and a process of receiving, by at least one of the plurality of display devices, an instruction to perform a reset and of performing a reset of the own display device.

Advantageous Effects of Invention

According to the present invention, the signal information of each image signal of the plurality of connected display devices is compared, and a system reset is performed when the signal information is different. As a result, even if an image is erroneously determined, it can be automatically restored to a normal image.

DESCRIPTION OF EMBODIMENTS

Figure 1:
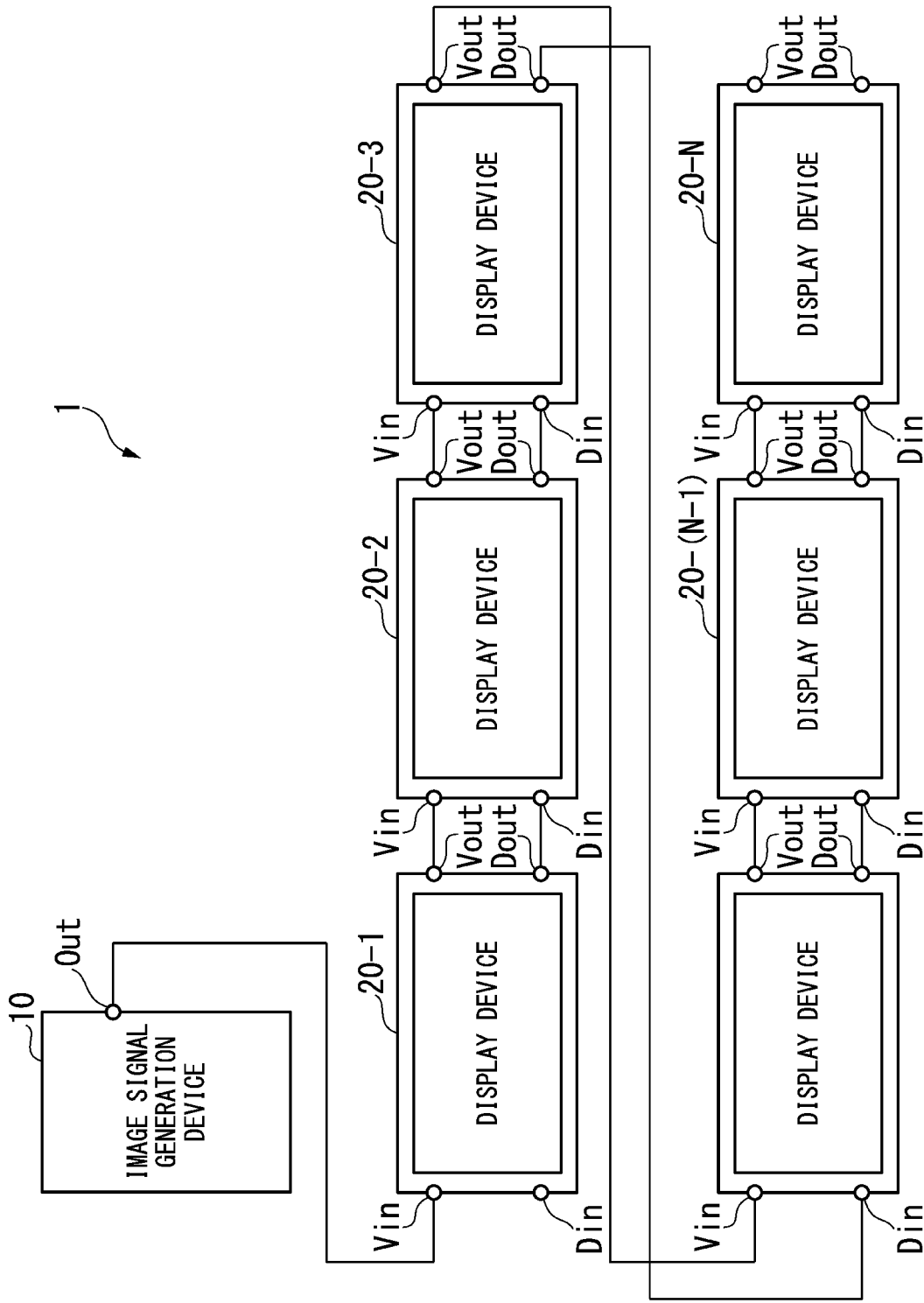
FIG. 1 is a block diagram which shows an outline of a multi-monitor system to which the present invention can be applied.

Hereinafter, embodiments of the present invention will be described with reference to the drawings. FIG. 1 is a block diagram which shows an outline of a multi-monitor system 1 to which the present invention can be applied. As shown in FIG. 1, the multi-monitor system 1 is configured by connecting an image signal generation device 10 and a plurality of display devices 20-1 to 20-N.

The image signal generation device 10 is, for example, a personal computer (PC), or a digital versatile disc (DVD) player. The display devices 20-1 to 20-N are, for example, liquid crystal displays.

In the multi-monitor system 1, it is possible to display an image on screens of the plurality of display devices 20-1 to 20-N as one large screen by arranging the plurality of display devices 20-1 to 20-N side by side. In addition, the same image can be displayed or individual images can be displayed on the individual display devices 20-1 to 20-N. In the multi-monitor system 1, the number N of the display devices 20-1 to 20-N that can be connected is arbitrary, and they may be arranged in any way. Moreover, in the following description, in particular, when the display devices 20-1 to 20-N are not limited, they may be referred to as a display device 20.

In this example, the display devices 20-1 to 20-N are connected using a daisy chain via a communication line. When the plurality of display devices 20-1 to 20-N are connected using a daisy chain, an image output terminal Vout of a display device on an upper side and an image input terminal Vin of a display device on a lower side are connected via a communication line. Moreover, a data output terminal Dout of the display device on the upper side and a data input terminal Din of the display device on the lower side are connected via a communication line.

That is, an image output terminal OUT of the image signal generation device 10 is connected to the image input terminal Vin of a first display device 20-1. The image output terminal Vout of display device 20-1 is connected to the image input terminal Vin of a second display device 20-2. The image output terminal Vout of the display device 20-2 is connected to the image input terminal Vin of a third display device 20-3. Hereinafter, the image output terminal Vout of an $(N-1)^{th}$ display device 20-(N-1) is connected to the image input terminal Vin of an $N^{th}$ display device 20-N.

In addition, the data output terminal Dout of the display device 20-1 is connected to the data input terminal Din of the second display device 20-2. The data output terminal Dout of the display device 20-2 is connected to the data input terminal Din of the third display device 20-3. Hereinafter, the data output terminal Dout of the $(N-1)^{th}$ display device 20-(N-1) is connected to the data input terminal Din of the $N^{th}$ display device 20-N.

When the plurality of display devices 20-1 to 20-N are connected using a daisy chain, a display ID is assigned to each of the display devices 20-1 to 20-N. Then, the display device 20-1 at the most upper level becomes a master side, the other display devices 20-2 to 20-N become slave sides, and data is transferred from the upper side to the lower side. By designating a display ID, the display device 20-1 on the master side can specify the display devices 20-2 to 20-N of the other side of communication and perform communication.

Figure 2:
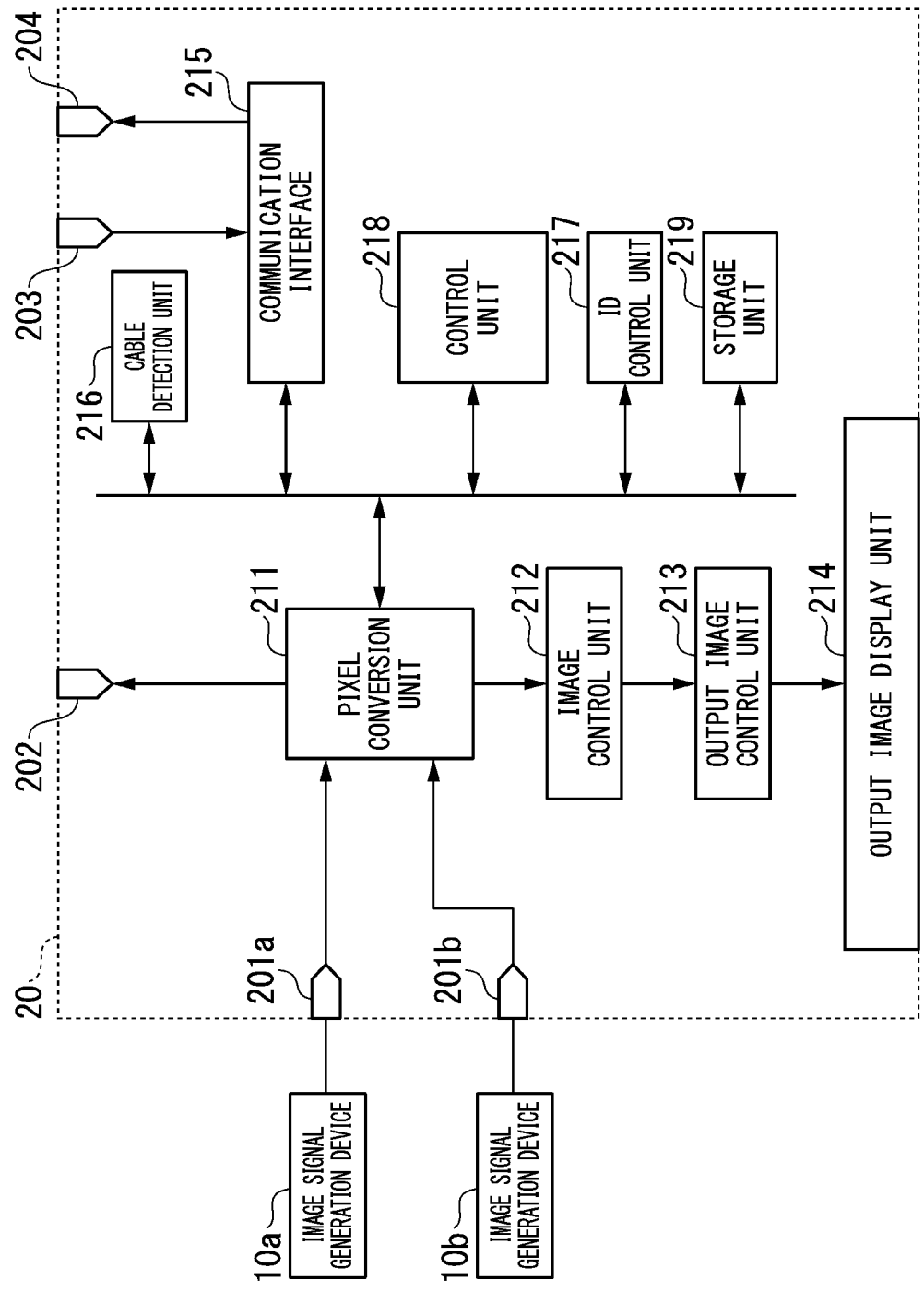
FIG. 2 is a block diagram which shows an internal configuration of a display device in the multi-monitor system to which the present invention can be applied.

FIG. 2 is a block diagram which shows an internal configuration of the display device 20 (20-1 to 20-N) in the multi-monitor system 1 to which the present invention can be applied.

As shown in FIG. 2, the display device 20 is provided with image input terminals 201a and 201b and an image output terminal 202. The image input terminals 201a and 201b correspond to the image input terminals Vin in FIG. 1. The image output terminal 202 corresponds to the image output terminal Vout in FIG. 1. As the image input terminals 201a and 201b and the image output terminal 202, various types such as DisplayPort (DP), high definition multimedia interface (HDMI) (registered trademark), digital visual interface (DVI), image graphics array (VGA), and RGB can be used. In this example, two image input terminals 201a and 201b are provided, but the number of image input terminals is not limited. Moreover, when a multi-monitor system is constructed using a daisy chain, either of the image input terminals 201a and 201b may be used. Furthermore, the number and types of the image input terminals 201a and 201b are not limited thereto, and various configurations can be considered. As for the image output terminal 202, various numbers and types can be considered.

In addition, the display device 20 is provided with a data input terminal 203 and a data output terminal 204. The data input terminal 203 corresponds to the data input terminal Din in FIG. 1. The data output terminal 204 corresponds to the data output terminal Dout in FIG. 1. A local area network (LAN) or RS232C is used as the data input terminal 203 and the data output terminal 204. The numbers and types of the data input terminal 203 and the data output terminal 204 are not limited thereto, and various configurations can be considered. Moreover, the data input terminal and the data output terminal are separated in this example, but a terminal in which data input and data output are performed in both directions may also be used.

Moreover, as shown in FIG. 2, the display device 20 includes a pixel conversion unit 211, an image control unit 212, an output image control unit 213, an output image display unit 214, a communication interface 215, a cable detection unit 216, an ID control unit 217, a control unit 218, and a storage unit 219.

The pixel conversion unit 211 selects a desired input image signal among image signals from the image input terminal 201a or 201b under control of the control unit 218, determines the input image signal, and sets a resolution. Resolutions that can be set include (1920×1080) pixels, (800×600) pixels, (640×480) pixels, and the like. In this example, an image signal from an image signal generation device 10a is input to the image input terminal 201a, and an image signal from an image signal generation device 10b is input to the image input terminal 201b. The image signal generation devices 10a and 10b are personal computers (PC), digital versatile disc (DVD) players, or the like. When a multi-monitor system is constructed using a daisy chain, an image signal from the display device 20 on the upper side is input to the image input terminal 201a or 201b. An image signal from the pixel conversion unit 211 is output from the image output terminal 202 and is supplied to the output image display unit 214 via the image control unit 212 and the output image control unit 213.

The image control unit 212 performs processing such as luminance correction and color correction on the input image signal. The output image control unit 213 controls synchronization signals, a transfer clock, and the like.

The output image display unit 214 is formed of, for example, a liquid crystal panel, and displays the corresponding screen from the image signal transmitted from the pixel conversion unit 211 via the image control unit 212 and the output image control unit 213.

The communication interface 215 performs data communication with another display device 20 via the data input terminal 203 and the data output terminal 204. That is, the communication interface 215 sends data from another display device 20 input from the data input terminal 203 to the control unit 218, and outputs the data from the control unit 218 from the data output terminal 204 to transmit the data to the other display device 20.

The cable detection unit 216 detects cables connected to the image input terminals 201a and 201b, the image output terminal 202, the data input terminal 203 and the data output terminal 204, and transmits them to the control unit 218. The ID control unit 217 manages a display ID.

The control unit 218 controls cable detection of each terminal detected by the cable detection unit 216, setting of the pixel conversion unit 211, and the like. In addition, the control unit 218 controls communication with another display device 20, search and comparison of data, reset processing of the other display device 20 and itself, and the like via the communication interface 215. Processing at the time of erroneous image determination according to the present invention may be mounted on the control unit 218 or may be provided outside the control unit 218.

The pixel conversion unit 211, the image control unit 212, the output image control unit 213, the cable detection unit 216, the communication interface 215, the control unit 218, and the ID control unit 217 described above may be configured by, for example, a processing device such as a central processing unit (CPU) or a dedicated electronic circuit.

Various types of data are stored in the storage unit 219. The storage unit 219 is configured by a storage medium, for example, a hard disk drive (HDD), a flash memory, an electrically erasable programmable read only memory (EEPROM), a random access read/write memory (RAM), a read only memory (ROM), or any combination of these storage media.

As described above, the display device 20 (20-1 to 20-N) has the pixel conversion unit 211, and the pixel conversion unit 211 determines an input image signal and sets the resolution. In a multi-monitor system in which the plurality of display devices 20 are arranged, resolution may be erroneously determined in rare cases. The present embodiment copes with such erroneous image determination.

Figure 3:
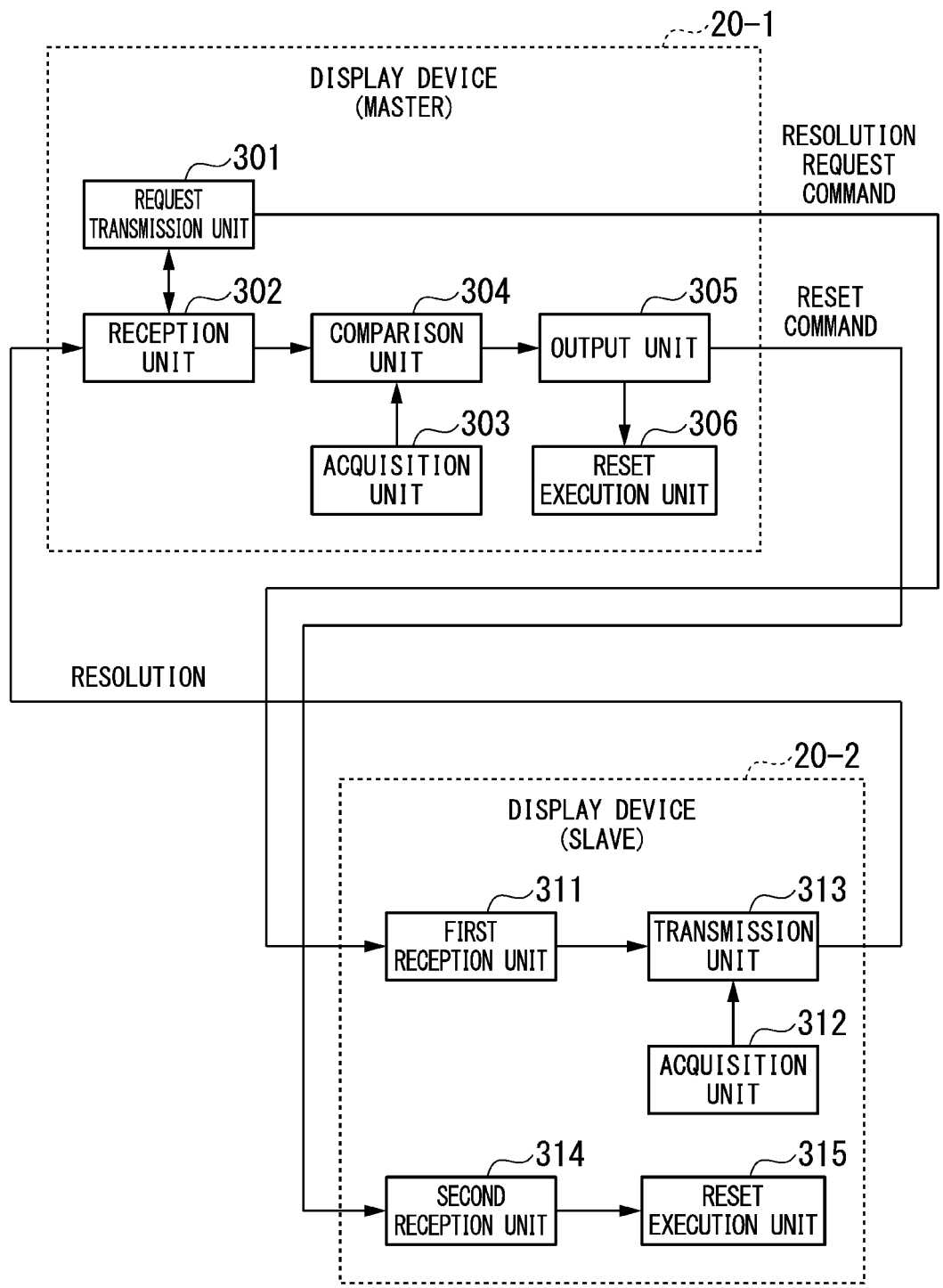
FIG. 3 is a functional block diagram which shows processing at the time of erroneous image determination in the multi-monitor system according to a first embodiment of the present invention.

FIG. 3 is a schematic block diagram which shows processing at the time of erroneous image determination in the multi-monitor system according to the first embodiment of the present invention.

As shown in FIG. 3, a display device 20-1 on a master side is configured of a request transmission unit 301, a reception unit 302, an acquisition unit 303, a comparison unit 304, an output unit 305, and a reset execution unit 306.

The request transmission unit 301 transmits a request command for a signal indicating a setting state for displaying an image signal, a resolution request command in this example, to the display device 20-2 on the slave side. The request command is a command to return at least one that is determined among a resolution, a horizontal frequency, a vertical frequency, H Total, V Total, H Active, and V Active. The request command may be predetermined as to which of the resolution, horizontal frequency, vertical frequency, H Total, V Total, H Active, and V Active is to be inquired about.

The reception unit 302 receives a signal (signal information corresponding to the command) indicating the setting state for displaying an image signal sent from the display device 20-2 on the slave side, a resolution in this example. The acquisition unit 303 acquires a resolution set in its own display device 20-1.

The comparison unit 304 compares a resolution of the display device 20-2 on the slave side received by the reception unit 302 with the resolution of its own display device 20-1 acquired by the acquisition unit 303, and determines whether to perform a reset. In this example, the comparison unit 304 determines to perform a reset when the resolution of the display device 20-2 on the slave side and the resolution of its own display device 20-1 are different from each other.

The output unit 305 transmits a reset command to the display device 20-2 on the slave side on the basis of a result of the determination by the comparison unit 304. In addition, the output unit 305 transmits a reset command of its own display device 20-1 to the reset execution unit 306 on the basis of a result of the determination by the comparison unit 304. The reset execution unit 306 executes a system reset of its own display device 20-1 in response to an output of an instruction to perform a reset from the output unit 305.

A display device 20-2 on a slave side is configured from a first reception unit 311, an acquisition unit 312, a transmission unit 313, a second reception unit 314, and a reset execution unit 315.

The first reception unit 311 receives a resolution request command sent from the display device 20-1 on the master side. The acquisition unit 312 acquires the resolution set in its own display device 20-2. If the first reception unit 311 receives the resolution request command from the display device 20-1 on the master side, the transmission unit 313 transmits the resolution set in its own display device 20-2 to the display device 20-1 on the master side. The second reception unit 314 receives a reset command sent from the display device 20-1 on the master side. If the second reception unit 314 receives the reset command, the reset execution unit 315 executes the system reset of its own display device 20-2.

The request transmission unit 301, the reception unit 302, the acquisition unit 303, the comparison unit 304, the output unit 305, the reset execution unit 306, the first reception unit 311, the acquisition unit 312, the transmission unit 313, the second reception unit 314, and the reset execution unit 315 described above may be configured by, for example, a processing device such as a central processing unit (CPU) or a dedicated electronic circuit.

As shown in FIG. 3, in the present embodiment, the request transmission unit 301 of the display device 20-1 on the master side transmits a resolution request command to the display device 20-2 on the slave side, and the reception unit 302 receives the resolution sent from the display device 20-2 on the slave side. Then, when the resolution of the display device 20-2 on the slave side and the resolution of its own display device 20-1 are different from each other, the comparison unit 304 performs the system reset of the display device 20-1 and transmits a reset command to the display device 20-2. As a result, it possible to re-project an image normally when setting of the resolution is not performed normally.

In this example, a setting value of the resolution is used as signal information indicating a setting state related to a display of an image signal, but the signal information indicating a setting state related to the display of an image signal may be a signal indicating the setting state for displaying the image signal, and the signal information may also be at least one of a resolution, a horizontal frequency, a vertical frequency, H Total, V Total, H Active, V Active, and the like.

Figure 4A:
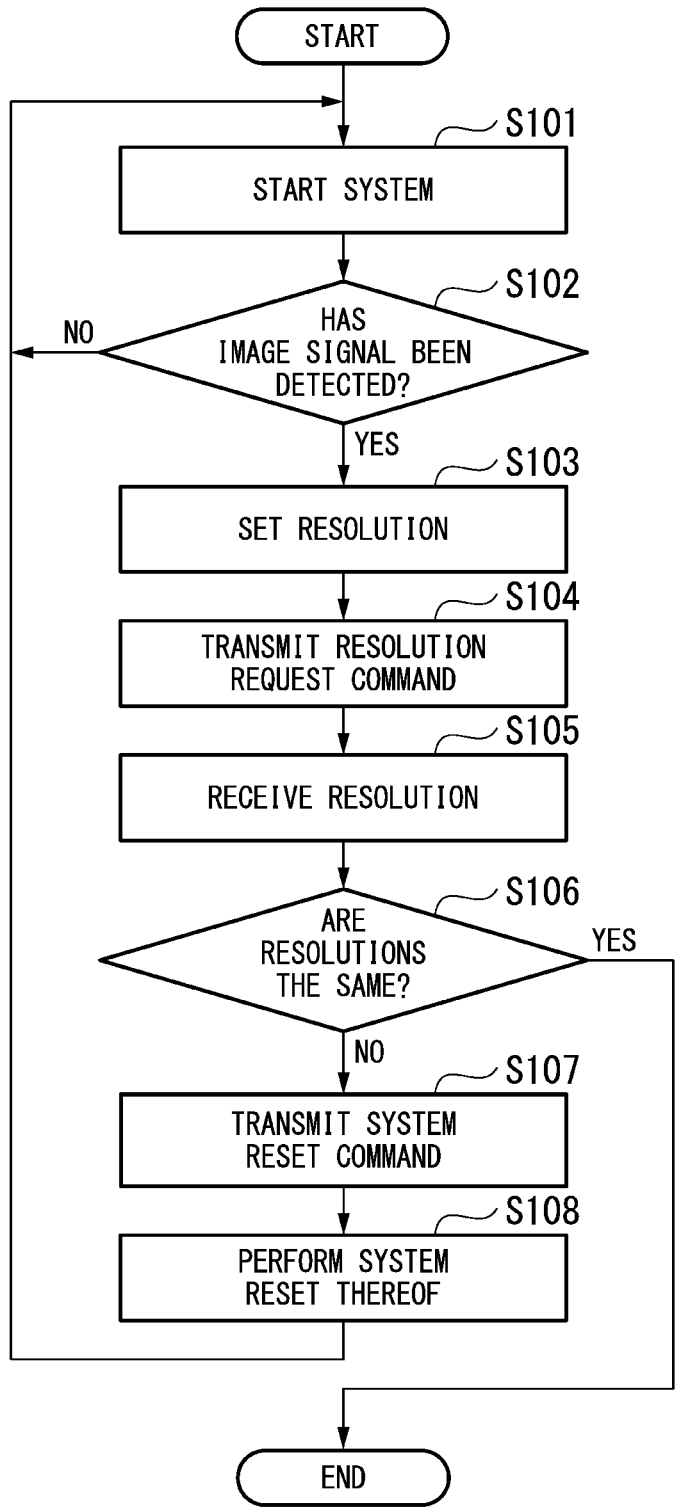
FIG. 4A is a flowchart which shows processing using a display device on a master side in the multi-monitor system according to the first embodiment of the present invention.

FIG. 4A is a flowchart which shows processing using the display device 20-1 on the master side in the multi-monitor system according to the first embodiment of the present invention.

(Step S101) The display device 20-1 on the master side starts the system when the power is turned on, and advances processing to step S102.

(Step S102) The display device 20-1 on the master side determines whether an image signal has been detected, and, if there is no image signal (No in step S102), stands by until an image signal is input. When the display device 20-1 on the master side detects an image signal (Yes in step S102), it advances the processing to step S103.

(Step S103) The display device 20-1 on the master side determines a resolution of the input image signal, sets a resolution of the pixel conversion unit 211 according to the resolution, and advances the processing to step S104.

(Step S104) The display device 20-1 on the master side transmits a resolution request command to the display device 20-2 on the slave side, and advances the processing to step S105.

(Step S105) The display device 20-1 on the master side receives a resolution from the display device 20-2 on the slave side, and advances the processing to step S106.

(Step S106) Whether the display device 20-1 on the master side compares the resolution received from the display device 20-2 on the slave side with the resolution set in an own display device 20-1, and determines whether they are the same resolution. If the resolution received from the display device 20-2 on the slave side and the resolution set in the own display device 20-1 are the same resolution (Yes in step S106), the display device 20-1 on the master side ends the processing, and advances the processing to step S107 if the resolutions are not the same (No in step S106).

(Step S107) The display device 20-1 on the master side transmits a system reset command to the display device 20-2 on the slave side, and advances the processing to step S108.

(Step S108) The display device 20-1 on the master side performs the system reset thereof and returns the processing to step S101.

Figure 4B:
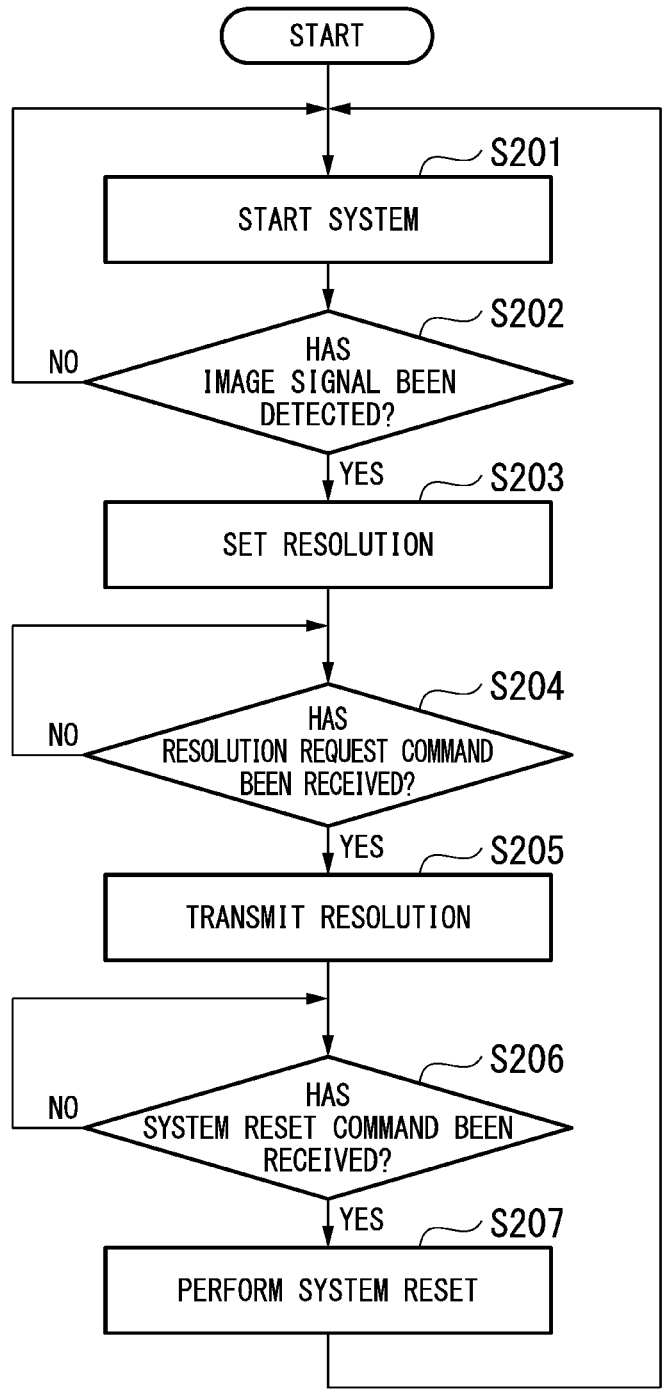
FIG. 4B is a flowchart which shows processing using a display device on a slave side in the multi-monitor system according to the first embodiment of the present invention.

FIG. 4B is a flowchart which shows processing using the display device 20-2 on a slave side in the multi-monitor system according to the first embodiment of the present invention.

(Step S201) The display device 20-2 on the slave side starts the system when the power is turned on, and advances processing to step S202.

(Step S202) The display device 20-2 on the slave side determines whether an image signal has been detected, and, if there is no image signal (No in step S202), stands by until an image signal is input. When the display device 20-2 on the slave side detects an image signal (Yes in step S202), it advances the processing to step S203.

(Step S203) The display device 20-2 on the slave side determines a resolution of the input image signal, sets the resolution of the pixel conversion unit 211 according to the resolution, and advances the processing to step S204.

(Step S204) The display device 20-2 on the slave side determines whether a resolution request command has been received from the display device 20-1 on the master side. When the display device 20-2 on the slave side receives a resolution request command (Yes in step S204), it advances the processing to step S205.

(Step S205) The display device 20-2 on the slave side transmits the resolution to the display device 20-1 on the master side, and advances the processing to step S206.

(Step S206) The display device 20-2 on the slave side determines whether a system reset command has been received from the display device 20-1 on the master side. When the display device 20-2 on the slave side receives a system reset command (Yes in step S206), it advances the processing to step S207.

(Step S207) The display device 20-2 on the slave side performs the system reset thereof and returns the processing to step S201.

By performing the processing described above, in a multi-monitor system constructed by connecting two display devices 20-1 and 20-2 using a daisy chain, it is possible to re-project an image normally by performing reset processing using the display device 20-1 or 20-2 when an erroneous image determination is made. This will be described below.

Figures 5, 6A, 6B:
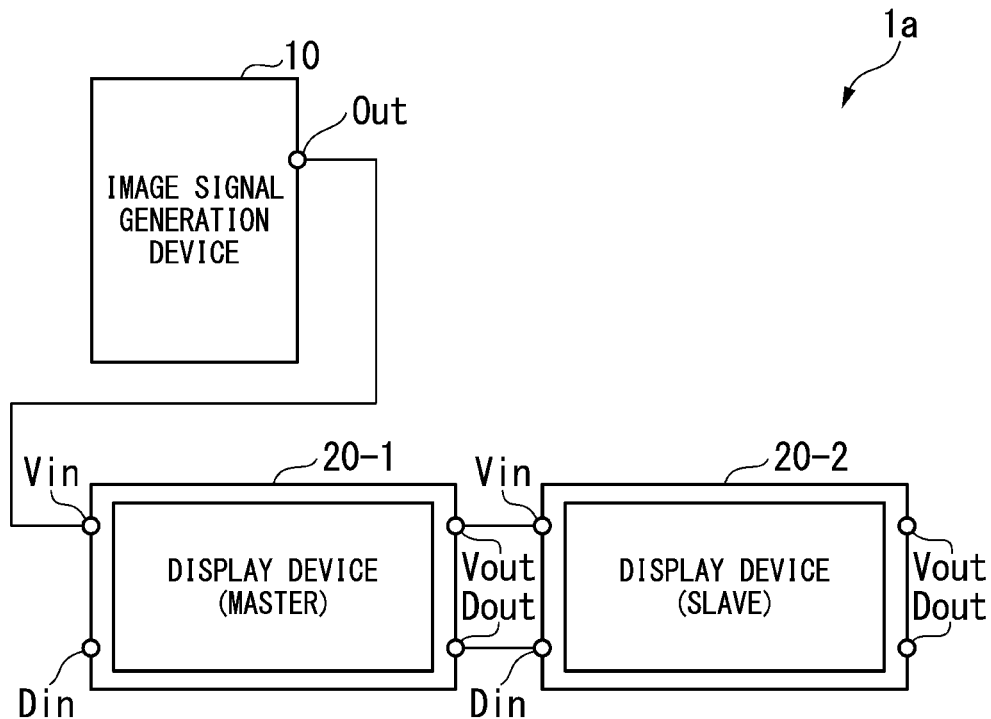
FIG. 5 is a diagram which describes processing at the time of erroneous image determination when the multi-monitor system is configured by two display devices according to the first embodiment of the present invention.
FIG. 6A is a diagram which describes processing at the time of erroneous image determination when the multi-monitor system is configured by two display devices according to the first embodiment of the present invention.
FIG. 6B is a diagram which describes processing at the time of erroneous image determination when the multi-monitor system is configured by two display devices according to the first embodiment of the present invention.

FIGS. 5, 6A, and 6B are diagrams which describe processing at the time of erroneous image determination when a multi-monitor system 1*a* is configured from two display devices according to the first embodiment of the present invention. As shown in FIG. 5, when the multi-monitor system 1a is configured from two display devices 20-1 and 20-2, the display device 20-1 is the master side and the display device 20-2 is the slave side.

In FIGS. 4A and 4B, the display device 20-1 serving as the master side transmits a resolution request command to the display device 20-2 serving as the slave side (step S104), and if the display device 20-2 serving as the slave side receives the resolution request command (Yes in step S204), it returns the resolution to the display device 20-1 serving as the master side (step S205). Then, if the display device 20-1 serving as the master side receives the resolution from the display device 20-2 serving as the slave side (step S105), the resolution of the display device 20-2 and the resolution of its own display device 20-1 are compared, and it is determined whether the resolutions are the same (step S106).

Here, if the system operates normally, the resolutions of the two display devices 20-1 and 20-2 are set to the same as shown by a setting value 51 in FIG. 6A. In this example, the resolutions of the display devices 20-1 and 20-2 are both set to (1920×1080) together. If the resolution of the display device 20-1 and the resolution of the display device 20-2 are the same (Yes in step S106), a problem of image determination processing does not occur, and thus the processing ends.

On the other hand, if it is assumed that any one of the display device 20-1 and a display device 20-N erroneously determines an image, the resolution of the display device 20-1 and the resolution of the display device 20-2 are different from each other as shown by a setting value 52 in FIG. 6B. In this example, while the resolution of the display device 20-1 is set to (1920×1080), the resolution of the display device 20-2 is set to (800×600). In this case, it is necessary to perform a system reset and to perform image determination processing again.

In FIGS. 4A and 4B, when the resolution of the display device 20-1 and the resolution of the display device 20-N are different from each other (No in step S106), the display device 20-1 on the master side transmits a system reset command to the display device 20-2 on the slave side (step S107) and resets the display device 20-2 on the slave side. In addition, the display device 20-1 is performing a system reset of its own device (step S108). As a result, in the display device 20-1 on the master side, the processing returns to step S101, an image signal is detected again (step S102), and the resolution is set again (step S103). Moreover, the display device 20-2 on the slave side performs a system reset (step S207) if it receives a reset command from the display device 20-1 serving as the master side (Yes in step S206). As a result, in the display device 20-2 on the slave side, the processing returns to step S201, an image signal is detected again (step S202), and the resolution is set again (step S203). As a result, it possible to re-project an image normally.

Generally, an image signal can be displayed normally by executing a system reset several times, but if an image signal cannot be displayed normally even after executing a system reset several times, the display device 20-1 on the master side may determine that there is a failure and display an error.

Next, a second embodiment of the present invention will be described. In the first embodiment described above, two display devices 20-1 and 20-2 are processed at the time of erroneous image determination. On the other hand, in the present embodiment, a plurality of display devices 20-1 to 20-N will be processed at the time of erroneous image determination. Here, a case of three display devices 20-1 to 20-3 will be described, but the same will be applied to a case of N display devices 20-1 to 20-N.

Figure 7A:
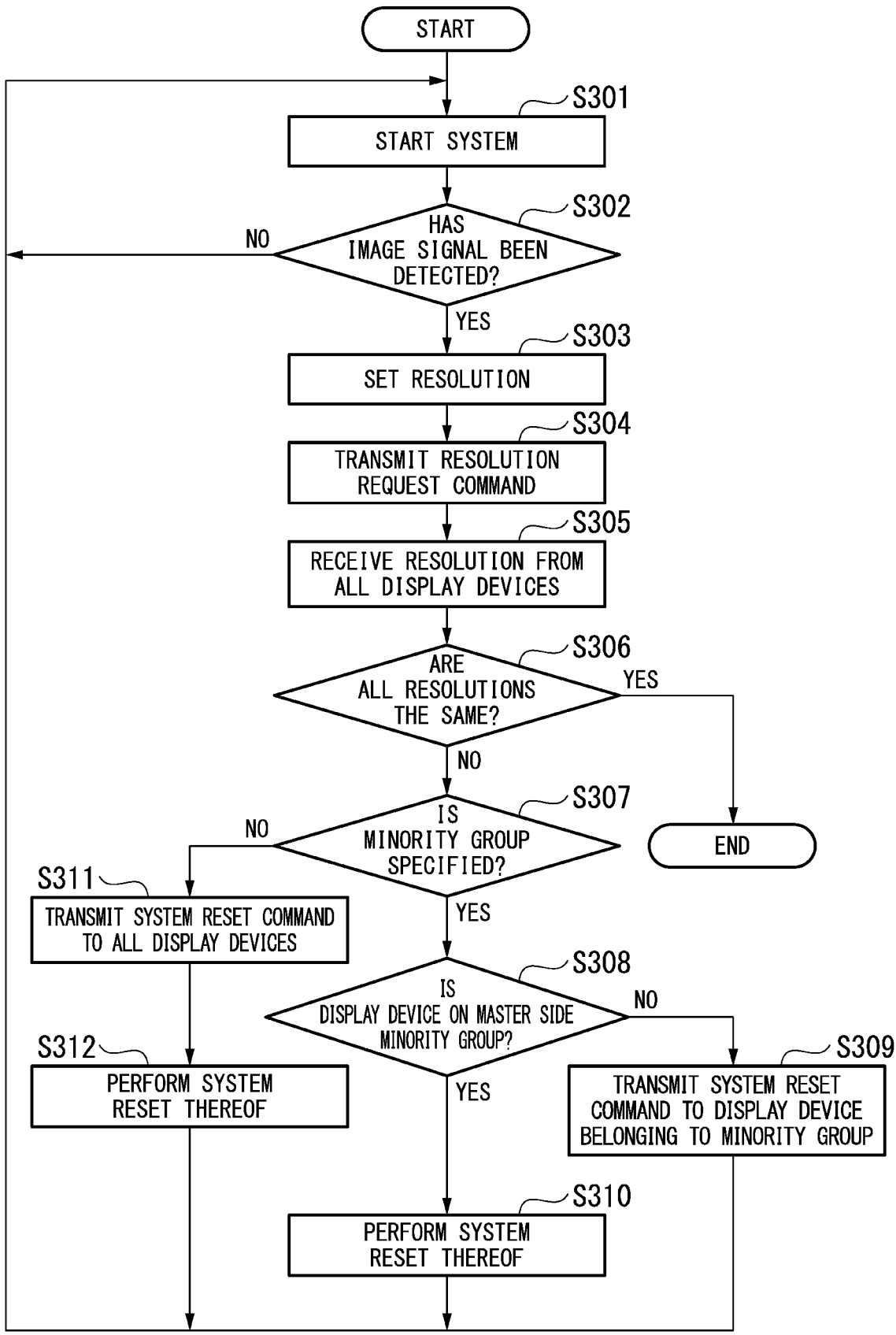
FIG. 7A is a flowchart which shows processing using a display device on a master side in a multi-monitor system according to a second embodiment of the present invention.

FIG. 7A is a flowchart which shows processing using the display device 20-1 on a master side in the multi-monitor system according to the second embodiment of the present invention.

(Step S301) The display device 20-1 on the master side starts the system when the power is turned on, and advances processing to step S302.

(Step S302) The display device 20-1 on the master side determines whether an image signal has been detected, and, if there is no image signal (No in step S302), stands by until an image signal is input. When the display device 20-1 on the master side detects an image signal (Yes in step S302), it advances the processing to step S303.

(Step S303) The display device 20-1 on the master side determines a resolution of the input image signal, sets the resolution of the pixel conversion unit 211 according to the resolution, and advances the processing to step S304.

(Step S304) The display device 20-1 on the master side transmits a resolution request command to the display devices 20-2 and 20-3 on the slave side, and advances the processing to step S305.

(Step S305) The display device 20-1 on the master side receives a resolution as a response to the resolution request command from the display devices 20-2 and 20-3 on the slave side, and advances the processing to step S306.

(Step S306) The display device 20-1 on the master side compares the resolution received from the display devices 20-2 and 20-3 on the slave side with the resolution set in the own display device 20-1, and determines whether all of the display devices 20-1 to 20-3 have the same resolution. If the resolutions of all the display devices 20-1 to 20-3 are the same (Yes in step S306), the display device 20-1 ends the processing, and advances the processing to step S307 if they are not the same resolution (No in step S306).

(Step S307) The display device 20-1 on the master side classifies the resolution of the own display device 20-1 and the resolution of the other display devices 20-2 and 20-3. Here, the display device 20-1 on the master side specifies the number of display devices having common signal information (resolution) for each setting content, and determines whether a minority group that is a group in which the specified number is smaller than the number of display devices of other setting contents (a group is a set of at least one display device) can be specified. If a minority group can be specified (Yes in step S307), the display device 20-1 on the master side advances the processing to step S308, and advances the processing to step S311 if a minority group cannot be specified (No in step S307). The minority group herein refers to a display device belonging to the number of display devices having the same resolution, which is smaller than the number of display devices of other resolutions, in respective display devices constituting the multi-monitor system.

(Step S308) The display device 20-1 on the master side determines whether the display device itself belongs to the minority group, advances the processing to step S310 if it belongs to the minority group (Yes in step S308), and advances the processing to step S309 if it does not belong to the minority group (No in step S308).

(Step S309) The display device 20-1 on the master side transmits a system reset command to a display device belonging to the minority group among the display devices 20-2 and 20-3 on the slave side, and returns the processing to steps S301.

(Step S310) The display device 20-1 on the master side performs the system reset thereof and returns the processing to step S301.

(Step S311) The display device 20-1 on the master side transmits a system reset command to all the connected display devices 20-2 and 20-3, and advances the processing to step S312.

(Step S312) The display device 20-1 on the master side performs the system reset thereof and returns the processing to step S301.

Figure 7B:
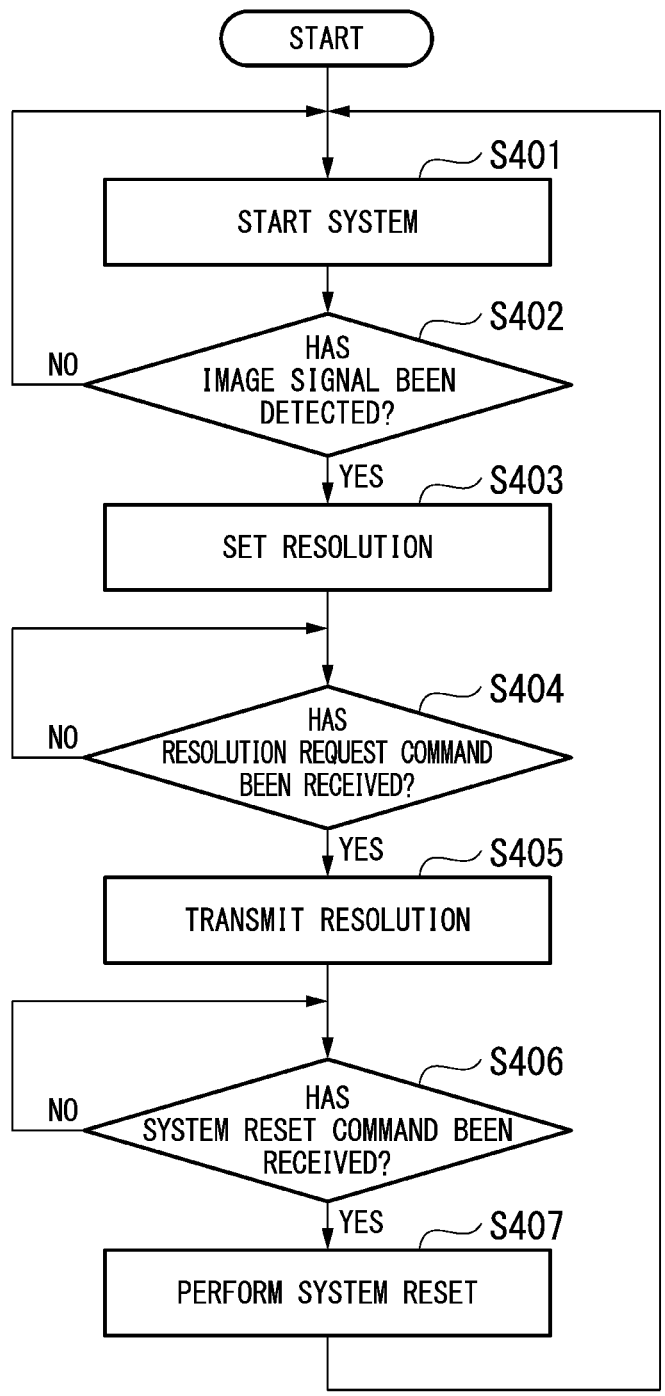
FIG. 7B is a flowchart which shows processing using a display device on a slave side in the multi-monitor system according to the second embodiment of the present invention.

FIG. 7B is a flowchart which shows processing using the display devices 20-2 and 20-3 on the slave side in the multi-monitor system according to the second embodiment of the present invention.

(Step S401) The display devices 20-2 and 20-3 on the slave side start the system when the power is turned on, and advance the processing to step S402.

(Step S402) The display devices 20-2 and 20-3 on the slave side determine whether an image signal has been detected, and, if there is no image signal (No in step S402), stand by until an image signal is input. When the display devices 20-2 and 20-3 on the slave side detect an image signal (Yes in step S402), the display devices advance the processing to step S403.

(Step S403) The display devices 20-2 and 20-3 on the slave side determine a resolution of the input image signal, set the resolution of the pixel conversion unit 211 according to the resolution, and advance the processing to step S404.

(Step S404) The display devices 20-2 and 20-3 on the slave side determine whether a resolution request command has been received from the display device 20-1 on the master side. When the display devices 20-2 and 20-3 on the slave side receive a resolution request command (Yes in step S404), the display devices advance the processing to step S405.

(Step S405) The display devices 20-2 and 20-3 on the slave side transmit the resolutions to the display device 20-1 on the master side, and advance the processing to step S406.

(Step S406) The display devices 20-2 and 20-3 on the slave side determine whether a system reset command has been received from the display device 20-1 on the master side. When the display devices 20-2 and 20-3 on the slave side receive a system reset command (Yes in step S406), the display devices advance the processing to step S407.

(Step S407) The display device 20-2 on the slave side performs the system reset thereof and returns the processing to step S401.

By performing the processing described above, in a multi-monitor system constructed by connecting the plurality of display devices 20-1 to 20-N using a daisy chain, it is possible to re-project an image normally by performing reset processing using the display devices 20-1 to 20-N when an erroneous image determination is made. This will be described below.

Figure 8:
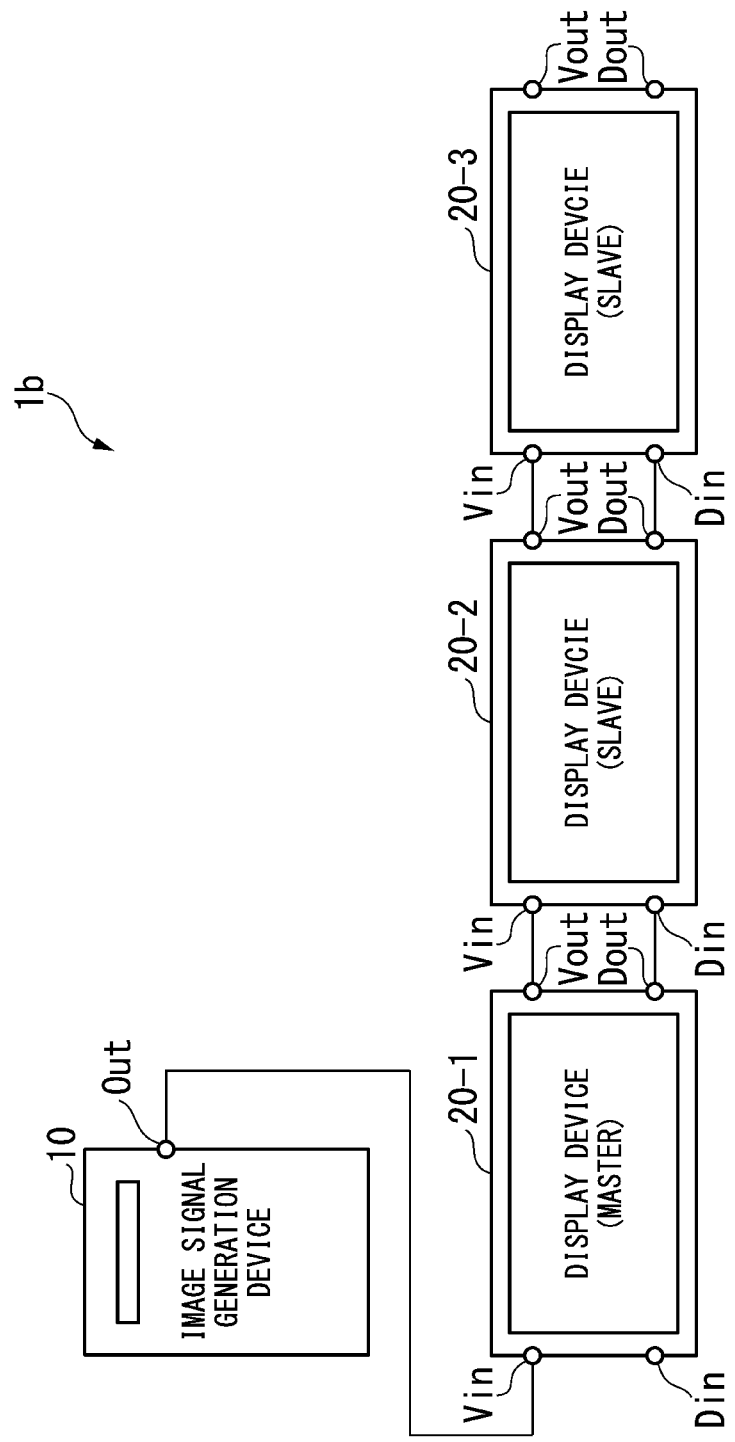
FIG. 8 is a diagram which describes processing at the time of erroneous image determination when the multi-monitor system is configured by three display devices according to the second embodiment of the present invention.

FIGS. 8, 9A, 9B, and 9C are diagrams which describe processing at the time of erroneous image determination when the multi-monitor system 1b is configured from three display devices according to the second embodiment of the present invention. As shown in FIG. 8, when the multi-monitor system 1b is configured from a plurality (three herein) of display devices 20-1 to 20-3, the display device 20-1 is a master side, and the other display devices 20-2 and 20-3 are slave sides.

In FIGS. 7A and 7B, the display device 20-1 on the master side transmits a resolution request command to the display devices 20-2 and 20-3 on the slave side (step S304). If the display devices 20-2 and 20-3 on the slave side receive the resolution request command (Yes in step S404), the display devices transmit the resolution to the display device 20-1 on the master side (step S405). Then, if the display device 20-1 on the master side receives the resolution from the display devices 20-2 and 20-3 on the slave side (step S305), it compares the resolution of the own display device 20-1 with the resolutions of the display devices 20-2 and 20-3, and determines whether all the resolutions are the same (step S306).

Figure 9A:
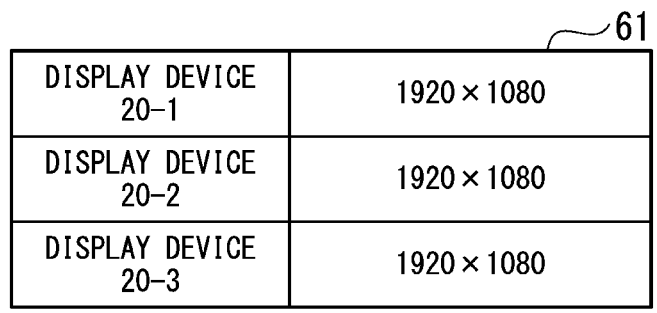
FIG. 9A is a diagram which describes processing at the time of erroneous image determination when the multi-monitor system is configured by three display devices according to the second embodiment of the present invention.

Here, if the system operates normally, the resolutions of all the display devices 20-1 to 20-3 are set to the same as shown by a setting value 61 in FIG. 9A. In this example, the resolutions of the display devices 20-1 to 20-3 are all set to (1920×1080). If the resolutions of the display devices 20-1 to 20-3 are all the same (Yes in step S306), the problem of image determination processing does not occur, and thus the processing ends.

Figure 9B:
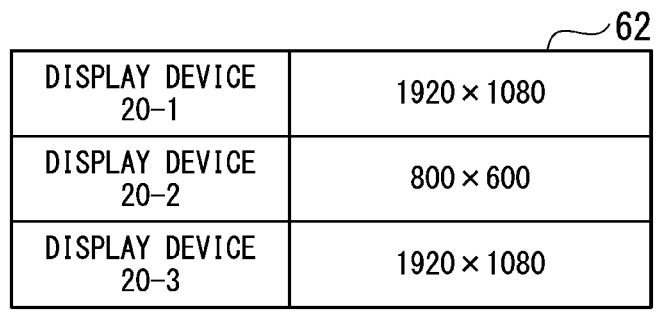
FIG. 9B is a diagram which describes processing at the time of erroneous image determination when the multi-monitor system is configured by three display devices according to the second embodiment of the present invention.
Figure 9C:
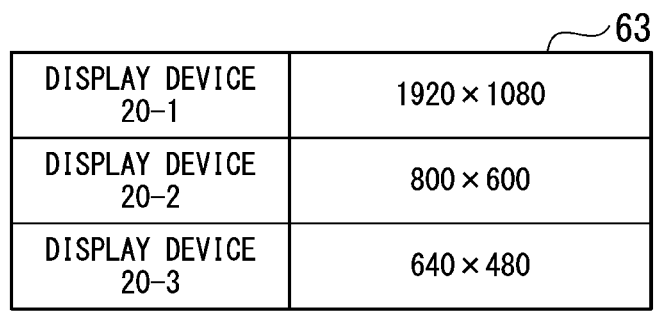
FIG. 9C is a diagram which describes processing at the time of erroneous image determination when the multi-monitor system is configured by three display devices according to the second embodiment of the present invention.

On the other hand, if it is assumed that any one of the display devices 20-1 to 20-3 erroneously determines an image, as shown by setting values 62 and 63 in FIGS. 9B and 9C, the resolutions of the display devices 20-1 to 20-3 are different from each other. In the example of a setting value 62, the resolutions of display devices 20-1 and 20-3 are set to (1920×1080), but only the resolution of the display device 20-2 is set to (800×600). In the example of a setting value 63, the resolutions of the display devices 20-1 to 20-3 are all different, the resolution of the display device 20-1 is set to (1920×1080), the resolution of the display device 20-2 is set to (800×600), and the resolution of the display device 20-3 is set to (640×480).

If the resolutions of two display devices 20-1 and 20-3 are the same and the resolution of only one display device 20-2 is different, as shown by the setting value 62, the original resolution is (1920×1080), the resolution of two display devices 20-1 and 20-3, which are a majority, and it is considered that an image signal is erroneously determined in the display device 20-2, which is a minority group. Therefore, in this case, the system reset of the display device 20-2 is required.

In FIGS. 7A and 7B, when the resolution of the display device 20-2 only is different, a minority group can be specified on the basis of the resolution (Yes in step S307). That is, in the example of the setting value 62, if the display devices having the same resolution for each setting value are classified on the basis of the resolution, the number of display devices having the resolution (1920×1080) is "2," and the number of display devices having the resolution (800×600) is "1." Accordingly, the resolutions of the display devices 20-1 and 20-3 serve as a majority, and the resolution of the display device 20-2 serves as a minority group. When the minority group can be specified in this manner, the display device 20-1 on the master side transmits a system reset command to the display device 20-2 on the slave side, which is the minority group (step S309). As a result, in the display device 20-2 of the minority group, the processing is returned to step S401, an image signal is detected again (step S402), and the resolution is set again (step S403). In the example of the setting value 62, the display device 20-1 on the master side is not the minority group, but, if the display device 20-1 on the master side is the minority group (Yes in step S308), the display device 20-1 on the master side performs the system reset thereof (step S310).

In addition, as shown by the setting value 63 in FIG. 9C, it is assumed that the display device 20-1, the display device 20-2, and the display device 20-3 all have different resolutions. In this case, if the number of display devices is obtained by classifying display devices having the same setting value on the basis of a setting value, the number of display devices of each of a resolution (1920×1080), a resolution (800×600), and a resolution (640×480) is all "1," and the display device of the minority group cannot be specified (No in step S307). In this case, the display device 20-1 on the master side transmits a system reset command to all of the display devices 20-2 and 20-3 on the slave side (step S311). Then, the display device 20-1 on the master side performs the system reset thereof (step S312). As a result, in the display device 20-1 on the master side, the processing is returned to step S301, an image signal is detected again (step S302), and the resolution is set again (step S303). In addition, if all of the display devices 20-2 and 20-3 on the slave side receive a reset command from the display device 20-1 on the master side (Yes in step S406), the system reset thereof is performed (step S407). As a result, in the display devices 20-2 and 20-3 on the slave side, the processing is returned to step S401, an image signal is detected again (step S402), and the resolution is set again (step S403). Generally, the image signal can be displayed normally by executing a system reset several times.

Figure 10:
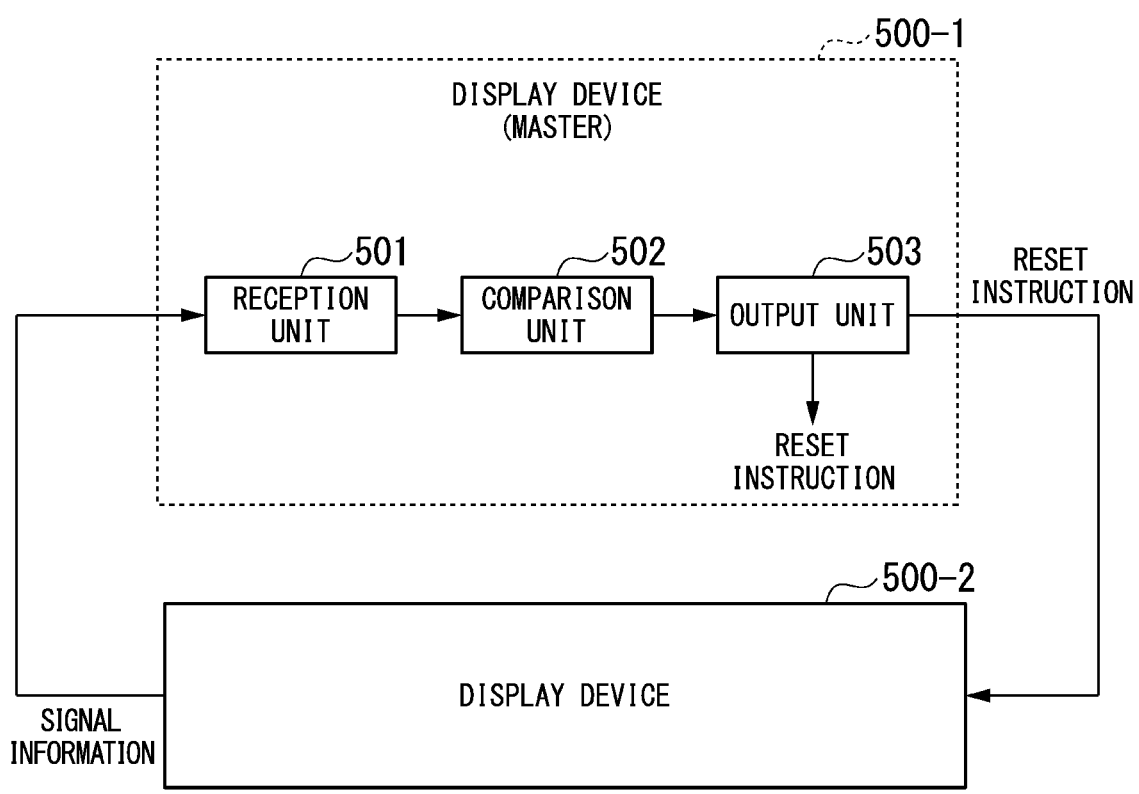
FIG. 10 is a schematic block diagram which shows a basic configuration of the display device of the present invention.

FIG. 10 is a schematic block diagram which shows a basis configuration of the display device of the present invention. As shown in FIG. 10, the display device of the present invention is a display device 500-1 that functions as a master in a multi-monitor system in which a plurality of display devices 500-1 and 500-2 are connected using a daisy chain to display an image signal, and includes a reception unit 501, a comparison unit 502, and an output unit 503. The reception unit 501 receives signal information indicating a setting state regarding a display of an image signal in the display device 500-2 from the display device 500-2 connected to a back stage of the own display device 500-1. The comparison unit 502 compares a setting state based on the received signal information with a setting state regarding the display of an image signal in the own display device 500-1. The output unit 503 outputs an instruction to perform a reset on at least one of a plurality of display devices 500-1 and 500-2 when the setting states are determined to be different as a result of the comparison.

The reception unit 501, the comparison unit 502, and the output unit 503 described above may be configured from, for example, a processing device such as a central processing unit (CPU) or a dedicated electronic circuit.

All or some of the multi-monitor systems 1, 1a and 1b in the embodiment described above may be realized by a computer. In this case, a program for realizing this function may be recorded on a computer-readable recording medium, and the program recorded on the recording medium may be realized by causing a computer system to read and execute it. A term of the "computer system" herein is assumed to include hardware such as peripheral devices and an OS. Moreover, the "computer-readable recording medium" refers to a storage device such as a flexible disk, a magneto-optical disc, a portable medium such as a ROM or a CD-ROM, or a hard disk embedded in the computer system. Furthermore, the "computer-readable recording medium" may include a unit that dynamically holds a program for a short period of time, like a communication line that transmits a program via a network such as the Internet or a communication line such as a telephone line, and a unit that holds a program for a certain period of time, like a volatile memory inside a computer system that serves as a server or client. Moreover, the program described above may be a program for realizing some of the functions described above, may be furthermore a program that can be realized in combination with a program already recorded in the computer system, and may also be a program that is realized by using a programmable logic device such as an FPGA.

Although the embodiments of the present invention have been described in detail with reference to the drawings, the specific configuration is not limited to this embodiment, and includes designs and the like within a range that does not deviate from the gist of the present invention.

REFERENCE SIGNS LIST

10 Image signal generation device
20, 20-1 to 20-N Display device
211 Pixel conversion unit
212 Image control unit
214 Output image display unit
215 Communication interface
218 Control unit

What is claimed is:

1. A display device in a multi-monitor system comprising a plurality of display devices daisy-chained to display an image signal, the plurality of display devices including the display device and one or more other display devices different from the display device, the display device comprising a processor configured to:

receive from the one or more other display devices, one or more pieces of signal information set to the one or more other display devices, respectively, the signal information regarding a display of the image signal, compare each of the one or more pieces of the signal information with first signal information set to the display device, the first signal information regarding a display of the image signal, based on determining that at least one of the one or more pieces of the signal information differs from the first signal information, transmit a first command causing at least one of the plurality of display devices to update the signal information, based on determining that at least one of the one or more pieces of the signal information differs from the first signal information, determine whether or not the plurality of display devices can be grouped into at least a first group and a second group, the first group including one or more display devices each set with the first signal information, the second group including one or more display devices each set with second signal information different from the first signal information, and a first quantity of display devices included in the first group differing from a second quantity of display devices included in the second group, based on determining that the plurality of display devices cannot be grouped into at least the first group and the second group, transmit a second command causing all of the one or more other devices to update the signal information, and cause the display device to update the signal information.

2. The display device according to claim 1, wherein the processor is further configured to:

transmit to the one or more other display devices, a third command requesting the one or more other display devices to transmit the one or more pieces of the signal information, respectively; and receive the one or more pieces of the signal information respectively from the one or more other display devices.

3. The display device according to claim 2, wherein:
each of the plurality of display devices comprises a first terminal for communicating the image signal and a second terminal different from the first terminal, and
the processor is further configured to transmit the third command and receive the one or more pieces of the signal information via a communication line connected to the second terminal.

4. The display device according to claim 1,
wherein the signal information indicates at least one of a resolution, a horizontal frequency, a vertical frequency, H Total, V Total, H Active, and V Active.

5. The display device according to claim 1,
wherein the signal information is included in the image signal.

6. The display device according to claim 1, wherein the processor is further configured to:
cause the display device to update the signal information, based on transmitting the first command.

7. The display device according to claim 1, wherein:
the signal information indicates a setting state regarding a display of the image signal, the setting state being set to each of the one or more other display devices connected to a back stage of the display device, and
the processor is further configured to compare the setting state indicated by each of the one or more pieces of the signal information with a first setting state regarding a display of the image signal, the first setting state being set to the display device.

8. The display device according to claim 1, wherein the processor is further configured to:
based on determining that the plurality of display devices can be grouped into at least the first group and the second group, determine whether or not the first quantity is smaller than the second quantity;
based on determining that the first quantity is greater than the second group, transmit a third command causing all of the one or more display devices included in the second group to update the signal information; and
based on determining that the first quantity is smaller than the second group, cause the display device to update the signal information.

9. A display device in a multi-monitor system comprising a plurality of display devices daisy-chained to display an image signal, the plurality of display devices including the display device and a first display device different from the display device, the display device comprising a processor configured to:
receive from the first display device, a first command requesting the display device to transmit signal information set to the display device, the signal information regarding a display of the image signal;
transmit the signal information to the first display device;
receive a second command causing the display device to update the signal information, the second command being transmitted from the first display device based on the first display device determining that the signal information differs from first signal information set to the first display device, the first signal information regarding a display of the image signal; and
based on receiving the second command, cause the display device to update the signal information, wherein:
the processor is further configured to receive a third command transmitted from the first display device, based on the first display device determining that at least one of one or more pieces of signal information received from one or more other display devices than the first display device among the plurality of display devices differs from the first signal information, and
the plurality of display devices cannot be grouped into at least a first group and a second group, the first group including one or more display devices each set with the first signal information, the second group including one or more display devices each set with second signal information different from the first signal information, a first quantity of display devices included in the first group differing from a second quantity of display devices included in the second group; and
the third command causes all of the one or more other devices to update the signal information.

10. The display device according to claim 9,
wherein the signal information indicates at least one of a resolution, a horizontal frequency, a vertical frequency, H Total, V Total, H Active, and V Active.

11. The display device according to claim 9,
wherein the signal information indicates a setting state regarding a display of the image signal, the setting state being set to the display device connected to a back stage of the first display device, and
the first display device is configured to compare the setting state with a first setting state regarding a display of the image signal, the first setting state being set to the first display device.

12. An image display method for a display device in a multi-monitor system comprising a plurality of display devices daisy-chained to display an image signal, the plurality of display devices including the display device and one or more other display devices different from the display device, the image display method comprising:
transmitting to the one or more other display devices, a first command requesting the one or more other display devices to transmit one or more pieces of signal information set to the one or more other display devices, respectively, the signal information regarding a display of the image signal;
receiving the one or more pieces of the signal information respectively from the one or more other display devices;
comparing each of the one or more pieces of signal information with first signal information set to the display device, the first signal information regarding a display of the image signal;
based on determining that at least one of the one or more pieces of the signal information differs from the first signal information, transmitting a second command causing at least one of the plurality of display devices to update the signal information;
based on determining that at least one of the one or more pieces of the signal information differs from the first signal information, determining whether or not the plurality of display devices can be grouped into at least a first group and a second group, the first group including one or more display devices each set with the first signal information, the second group including one or more display devices each set with second signal information different from the first signal information, and a first quantity of display devices included in the first group differing from a second quantity of display devices included in the second group; and
based on determining that the plurality of display devices cannot be grouped into at least the first group and the second group, transmitting a third command causing all of the one or more other devices to update the signal information, and causing the display device to update the signal information.

13. The image display method according to claim 12, further comprising:
based on determining that the plurality of display devices can be grouped into at least the first group and the second group, determining whether or not the first quantity is smaller than the second quantity; and
based on determining that the first quantity is greater than the second group, transmitting a fourth command causing all of the one or more display devices included in the second group to update the signal information; and
based on determining that the first quantity is smaller than the second group, cause the display device to update the signal information.

14. The image display method according to claim 12, wherein the signal information indicates at least one of a resolution, a horizontal frequency, a vertical frequency, H Total, V Total, H Active, and V Active.

15. The image display method according to claim 12, wherein the signal information is included in the image signal.

16. The image display method according to claim 12, further comprising:
causing the display device to update the signal information, based on transmitting the second command.

* * * * *